US006935614B2

(12) United States Patent
Schneller et al.

(10) Patent No.: US 6,935,614 B2
(45) Date of Patent: Aug. 30, 2005

(54) SAFETY COUPLING FOR AIR HOSES

(76) Inventors: Rudy A. Schneller, 502 Woodlawn Ave., O'Fallon, MO (US) 63366; Michael A. Schneller, 5870 Wellington Farm Dr., Harvester, MO (US) 63304

( * ) Notice: Subject to any disclaimer, the term of this patent is extended or adjusted under 35 U.S.C. 154(b) by 72 days.

(21) Appl. No.: 10/735,381

(22) Filed: Dec. 12, 2003

(65) Prior Publication Data

US 2004/0124390 A1 Jul. 1, 2004

Related U.S. Application Data

(60) Provisional application No. 60/437,150, filed on Dec. 30, 2002, provisional application No. 60/433,152, filed on Dec. 13, 2002, and provisional application No. 60/433,149, filed on Dec. 13, 2002.

(51) Int. Cl.[7] ................. F16K 51/00; F16L 29/00; F16L 37/28
(52) U.S. Cl. .................................... 251/149.6
(58) Field of Search .................... 251/149.1, 149.6, 251/149.7, 149.8

(56) References Cited

U.S. PATENT DOCUMENTS

| | | | |
|---|---|---|---|
| 1,092,673 A | | 4/1914 | Stephens |
| 1,924,374 A | | 8/1933 | Peteler |
| 2,265,267 A | * | 12/1941 | Cowles ................ 251/149.6 |
| 2,279,146 A | * | 4/1942 | Schneller ................ 285/277 |
| 4,114,853 A | | 9/1978 | Medvick |
| 4,664,420 A | * | 5/1987 | Demeri ................ 285/86 |
| 5,540,250 A | | 7/1996 | Mullins |
| 5,556,005 A | * | 9/1996 | Banks ................ 222/96 |
| 5,582,204 A | | 12/1996 | Hiranuma et al. |
| 6,325,099 B1 | * | 12/2001 | Bunschoten et al. ... 137/614.04 |
| 6,354,564 B1 | | 3/2002 | Van Scyoc et al. |

OTHER PUBLICATIONS

Web page–"Air Chief" Fittings—Dixon—1 page—Oct. 24, 2002.
Web pages–"General Lubrication Equipment & Accessories" pamphlet—Lincoln—4 pages—Form 442869 (Sep. 2001)—Copyright 2001.

* cited by examiner

Primary Examiner—Justine R. Yu
Assistant Examiner—John K. Fristoe, Jr.
(74) Attorney, Agent, or Firm—Polster, Lieder, Woodruff & Lucchesi, L.C.

(57) ABSTRACT

A coupling for an air hose that reduces or eliminates whipping of the free end of the hose when the coupling is detached. The coupling comprises a one-piece plug member, the plug member comprising a fitting at a first axial end, the fitting being adapted for connection to an air hose, an external circumferential groove, a beveled external shoulder forming a wall of the groove, an axial bore, the axial bore being closed at a second axial end of the plug member, and a plurality of air passages intersecting the axial bore near the closed end of the bore; a two-piece coupler member, the coupler member receiving the plug member and releasably locking with the groove on the plug member; the coupler member comprising a ring seal trapped between the two pieces of the coupler member, and a valve member seatable on an axial side of the ring seal. The plug member, when coupled with the coupler member, extends at least partially through the ring seal, forms a seal with it, displaces the valve member, and puts the air passages in the plug member functionally on the same axial side of the ring seal as the valve member. The air passages in the plug member are preferably collectively larger in cross-section than the bore, and preferably direct air from the bore back toward the open end of the plug. The invention permits simple adaptation of existing couplings to the improved design by modifying only the plug and the valve.

8 Claims, 2 Drawing Sheets

SAFETY COUPLING FOR AIR HOSES

CROSS-REFERENCE TO RELATED APPLICATIONS

This application claims priority of U.S. Provisional applications Ser. No. 60/433,149, filed Dec. 13, 2002, Ser. No. 60/433,152, filed Dec. 13, 2002, and Ser. No. 60/437,150, filed Dec. 30, 2002, the disclosures of which are incorporated by reference herein.

STATEMENT REGARDING FEDERALLY SPONSORED RESEARCH

Not Applicable.

BACKGROUND OF THE INVENTION

This invention relates to quick-connect couplings for hoses carrying compressed fluid. It is particularly adapted for use in hoses carrying compressed air to a tool or other equipment, although its usefulness is not limited thereto.

Compressed air hoses generally include a quick-connect coupling for connecting tools and the like. The coupling includes a female portion, also known as the coupler, connected to a source of compressed air, and a male portion, also known as the plug or nipple, generally attached to the equipment. Both the male and female portions include an axial bore through which the compressed air moves. When fully inserted, the free end of the plug engages and opens a spring-loaded valve in the coupler. The valve seats against a gasket when closed; when the valve is pushed open, air passages in a stem portion of the valve are moved to the upstream side of the gasket and permit air to flow through the coupling. The plug includes a circumferential indentation which is held by balls or pins in the coupler when the plug is fully inserted. The balls are held in a radially inward position by a spring-loaded sleeve, which is manually retracted to release the balls or pins, thereby permitting the plug to be released from the coupler.

A particularly effective coupling is described in Schneller, U.S. Pat. No. 2,279,146. Couplings made in accordance with this patent have been sold for many years by Lincoln Industrial Corp. of St. Louis, Mo., for example as its Model 815. Modern couplers made in accordance with this design may use pins rather than the balls 27, and the male portion (fitting F) is generally attached by a length of hose to the air chamber of a tool or other implement.

When the coupling is released, the coupler is of necessity being held by the person grasping the collar. The section of hose attached to the plug, however, is filled with compressed air and may whip about in a dangerous manner when released.

To prevent this problem, so-called safety couplings have been produced which permit a two-stage release of the plug and coupler. In the first stage, the plug moves sufficiently to permit air in its hose to be released; in the second stage, the plug itself is released. This type of system, however, is expensive to manufacture, is heavier than a standard coupling, and, because it requires two separate operations, is cumbersome and time-consuming to use. The problem of hose whip and the use of safety couplings to solve the problem are discussed, for example, by Richard T. Schneider in *Hydraulics & Pneumatics*, published Jul. 1, 2002, incorporated herein by reference.

Another approach is shown in Hiranuma et al., U.S. Pat. No. 5,582,204. That approach requires a specially formed coupler and a plug which is extremely difficult to manufacture. It also does not guarantee that the hose will not whip.

The patents referred to herein are incorporated herein by reference.

BRIEF SUMMARY OF THE INVENTION

In accordance with one aspect of the present invention, briefly stated, an improved coupling for an air hose is provided in which a one-piece plug member of the coupling includes a fitting at one axial end, the fitting being adapted for connection to an air hose, an external circumferential groove, a beveled external shoulder adjacent the groove, an axial bore, the axial bore being closed at a second axial end of the plug member, and a plurality of air passages intersecting the axial bore, the air passages collectively having a greater cross-sectional area than the cross-sectional area of the axial bore.

In accordance with another aspect of the invention, an improved coupling for an air hose is provided in which a one-piece plug member of the coupling includes a fitting at a first axial end, the fitting being adapted for connection to an air hose, an external circumferential groove, a beveled external shoulder adjacent the groove, an axial bore, the axial bore being closed at a second axial end of the plug member, and a plurality of air passages intersecting the axial bore, the closed end of the bore and the air passages directing air entering from the first axial end of the bore outwardly at least partially back toward the first axial end.

In accordance with another aspect of the invention, an improved coupling for an air hose is provided in which a one-piece plug member of the coupling includes a fitting at a first axial end, the fitting being adapted for connection to an air hose, an external circumferential groove, a beveled external shoulder adjacent the groove, an axial bore, the axial bore being closed at a second axial end of the plug member, and a plurality of air passages intersecting the axial bore adjacent the second end of the fitting, the axial bore having a diameter at the intersection of said air passages no greater than the smallest diameter of the axial bore.

In accordance with another aspect of the invention, an improved coupling for an air hose is provided in which a one-piece plug member of the coupling includes a fitting at a first axial end, the fitting being adapted for connection to an air hose, an external circumferential groove, a beveled external shoulder forming a wall of the groove, an axial bore, the axial bore being closed at a second axial end of the plug member, and a plurality of air passages intersecting the axial bore adjacent the second end of the fitting. The coupling also includes a two-piece coupler member, the coupler member receiving the plug member and releasably locking with the groove on the plug member. The coupler member includes a ring seal trapped between the two pieces of the coupler member, and a valve member seatable on an axial side of the ring seal. When it is inserted into the coupler, the plug member extends at least partially through the ring seal, forming a sliding seal with it, displaces the valve member, and puts the air passages in the plug member functionally on the same axial side of the ring seal as the valve member.

The air passages are preferably each at least half the cross-sectional area of the axial bore. The air passages are arranged equidistantly around the bore to equalize the force of exiting air and prevent whipping of the hose to which the plug is attached. In a preferred embodiment, the air passages are angled outwardly back at an angle of about 45° to straighten and tension the hose when the plug is released from the coupler.

In some embodiments of the coupler of the invention, the ring seal is a packing. In other embodiments it may be an o-ring or a square ring, or may be formed in multiple parts which are trapped between two parts of the coupler member.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENTS

The following detailed description illustrates the invention by way of example and not by way of limitation. The description clearly enables one skilled, in the art to make and use the invention, describes several embodiments, adaptations, variations, alternatives, and uses of the invention, including what is presently believed to be the best mode of carrying out the invention.

Figure 1:
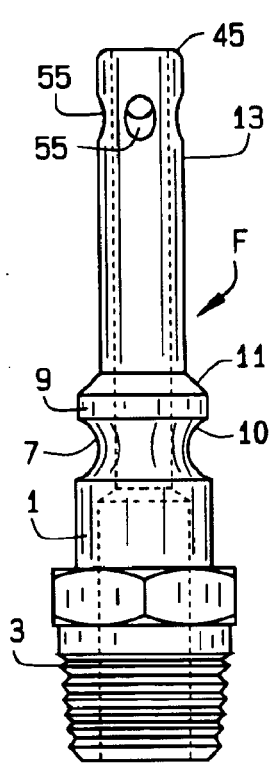
FIG. 1 is a view in side elevation of one illustrative embodiment of plug of the present invention.
Figure 2:
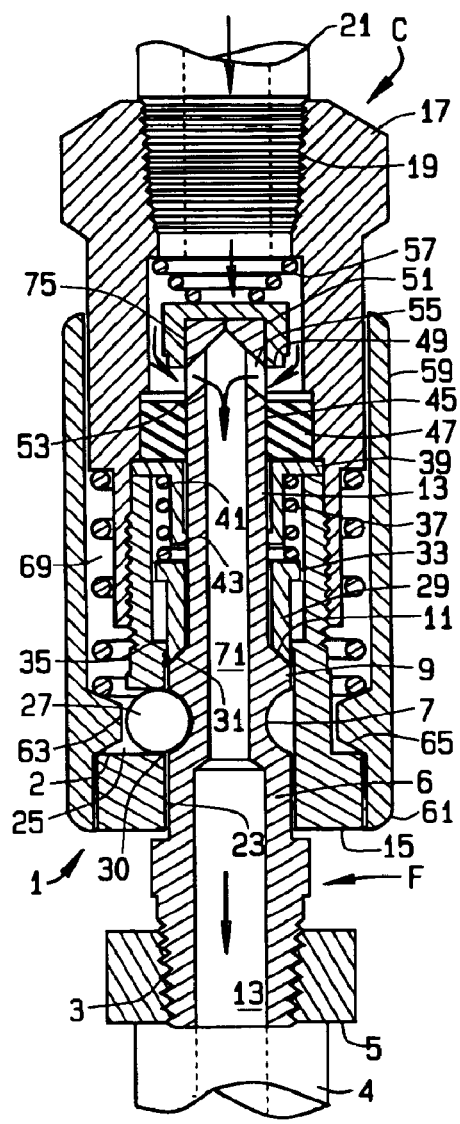
FIG. 2 is a cross-sectional view of a coupling utilizing a plug of FIG. 1 in accordance with the present invention.

Referring now to the drawings, and in particular to FIGS. 1 and 2, one illustrative embodiment of coupling of the present invention is indicated by reference numeral 1. It will be seen that this embodiment is a modification of the coupling of the above-mentioned Schneller, U.S. Pat. No. 2,279,146. Except as mentioned below, the reference numerals refer to the same parts as in that patent.

The coupling 1 includes a plug part F and a coupler part C. The plug F includes a threaded portion 3 for fastening the plug to a length of hose 4 through a standard threaded hose fitting 5. The hose 4 is illustratively attached to a pneumatic tool, not shown. A body 6 of the plug F includes a circumferential groove 7, a shoulder 9 having a sloped or beveled portion 10 on the groove side and a second beveled portion 11 connecting with a cylindrical sleeve 13. The cylindrical sleeve 13 is longer than the corresponding part of the Schneller '146 patent. The sleeve 13 includes a closed axial end 53 and four openings 55 spaced uniformly around the sleeve 13 and extending from the exterior of the plug F to an axial bore 71 in the plug F. The openings 55 are angled forty-five degrees with respect to the axis of the sleeve 13. As seen in FIG. 2, the openings 55 have a total cross-sectional area at least equal to the cross-sectional area of the bore 71, preferably in excess of its cross-sectional area, thereby decreasing the velocity of air exiting through them when the plug is released from the coupler. The bore 71 is axially connected to a larger section 73 of the axial bore. Because the bore 71 is no larger in diameter than the section 73, it is easy to form the entire bore with standard equipment.

The coupler C is substantially the same as in the Schneller '146 patent, being formed of a lower part 15 and upper part 17, permanently threaded together. A ring seal or packing 45 is trapped between the parts 15 and 17 of the coupler C. The ring seal forms a seat for the valve 51 and also forms a sliding seal with the sleeve 13 of plug F. The hexagonal valve 51 is modified in this embodiment. The lower portion of the valve and its extensions are eliminated. The shape of the valve 51 permits air flow around the valve body when it is lifted off the ring seal 45, while providing adequate alignment of the valve 51. A recess 75 is provided at the lower side of the valve 51. This simple modification of the valve 51 permits the use of all other elements of the coupler C of the Schneller '146 patent without modification.

The operation of the coupling 1 is the same as the operation of the Schneller '146 patent. When the plug F is released by operation of the sleeve 59, however, and the plug F clears the coupler C, exhaust of compressed air trapped in the hose 4 is through the openings 55. Therefore, rather than whipping, the hose 4 is gently pulled taut as the air escapes.

Figure 3:
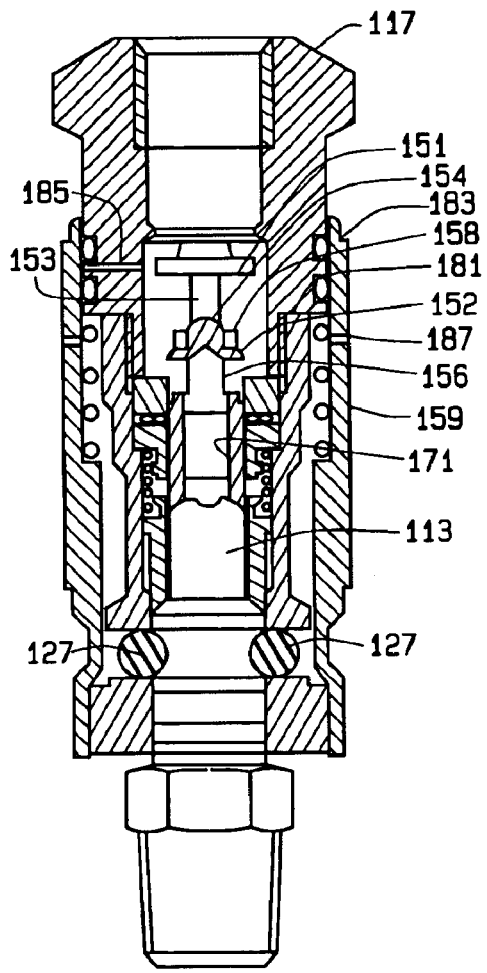
FIG. 3 is a cross-sectional view of a second illustrative embodiment of plug of the present invention, this embodiment being the design of others.

Another embodiment of coupling in accordance with the present invention is shown in FIG. 3. This embodiment is the design of engineers employed by Lincoln Industrial Corp., and is a modification of the Lincoln Industrial Model 815, a current commercial embodiment of coupling made in accordance with the Schneller '146 patent. It will be seen that the basic construction of this design is quite similar to the first embodiment, and corresponding parts will be identified with similar numbers. A difference in the design of this commercial embodiment is that the balls 27 of the Schneller '146 patent have been replaced by rollers 127. As in the first embodiment, the only modifications to the existing coupling in this embodiment are to the valve in the coupler member and to the sleeve portion of the plug.

The plug sleeve part 113 is extended and its-upper end 152 is closed. The closed end of the bore 171 of sleeve 113 is provided with a chamfer against which air is directed when the plug F' is detached from the coupler C', in the same manner as the closed bore of the valve plug F of the first embodiment. In this embodiment, however, the air passages in the plug sleeve are formed by milling two slots 156 in the side wall of the sleeve 113 near the upper end of the sleeve. The cross-sectional area of the slots is collectively substantially greater than the cross-sectional area of the bore 171. The upper end of the plug sleeve is provided with a protuberance 154.

The valve 151 is modified to provide its downwardly extending portion 153 with a socket 158 sized to accept the protuberance 154.

It may be noted that two o-rings 181 and 183 are set into circumferential grooves in the body part 117, forming a circumferential channel between the body part 117 and outer sleeve 159. A passage 185 in the body part 117 and passages 187 in the outer sleeve 159 provide an outlet for air in the chamber, permitting bleedoff of air in the inlet chamber of body part 117 above the valve 151, when the outer sleeve 159 is fully manually retracted.

When the plug F' is released by operation of the outer sleeve 59', and the plug F' clears the coupler C', exhaust of compressed air trapped in the hose to which the plug is attached is through the openings 156. Therefore, rather than whipping, the hose 4 quickly expels its air in a stable, balanced manner.

Figure 4:
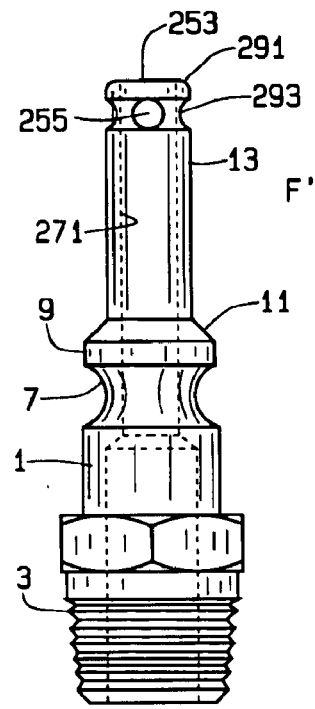
FIG. 4 is a view in side elevation, corresponding to FIG. 1, of another embodiment of plug of the present invention.
Figure 5:
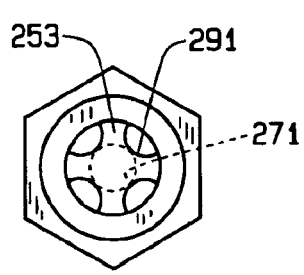
FIG. 5 is a view in top plan elevation of the plug of FIG. 4.

It will be appreciated by those skilled in the art that the plug F may be modified to place its inlets 55 functionally on the inlet side of the ring seal 47 while they are physically within the ring seal, by providing external air passages from the closed end 53 of the plug F. Thus, in the embodiment shown in FIGS. 4 and 5, axial air passages in the form of grooves 291 extend from the closed end 253 of the plug F' to an annular groove 293. The passages 255, which in this embodiment are perpendicular to the long axis of the plug F, intersect the annular groove 293. When the plug F' is fully inserted into the coupler C, the annular groove 293 is entirely positioned within the ring seal 47, and the ring seal 47 forms a seal with the outside of the plug F' below the annular groove 293. When the coupler C is released from the plug F, air escapes from the symmetrically placed passages 255 without causing the hose 4 to whip. Because the combined cross-sectional areas of the passages 255 is greater than the cross-sectional area of the axial bore 271, air escapes at a relatively low velocity. It will be seen that this embodiment permits the plug F to have the same external dimensions as the plug F of the Schneller '146 patent and thus permits the modified plug F' to be used with a standard coupler C without modification of the coupler C.

In this embodiment, the plug F' may, if desired, be made somewhat longer, to assure a tight air seal with the ring seal 47, while still requiring no modification of the coupler C. This arrangement may also allow the passages 255 to be angled rearwardly outward, although at an angle somewhat less than that of the first embodiment.

Figure 6:
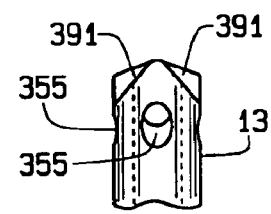
FIG. 6 is a fragmentary view in side elevation of the closed end of another embodiment of plug of the present invention.

It will also be appreciated by those skilled in the art that the fitting F may be modified to operate with other types of couplings than that shown in the Schneller '146 patent and sold by Lincoln Industrial Corp. For example, as shown in FIG. 6, the end of the fitting may be given a tapered (e.g., conical) closed end, and the closed end may be given flutes 391, grooves, crenellations, ribs, or the like to provide appropriate paths to the air passages 355. The coupler portion of these other designs may likewise be modified as appropriate to operate with the modified fitting. It will be understood that modifications to the ring seal, rather than or in addition to modifications to the valve, may-be made. For example, the ring seal may be extended or made in two parts, both trapped between the body halves of the coupler. Such modifications are well within the skill of those in the art in view of the foregoing disclosure.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense. By way of example, the invention may be applied to both automatic couplings (which can be snapped together without retracting the outer sleeve) and semi-automatic couplings (which require the sleeve to be retracted in order to attach the coupler and the plug) of various designs. The coupler part may include various ring seals corresponding to the seal 47 and various valves corresponding to the valve 51. The section 73 of axial bore 71 can have the same diameter as the remainder of the bore 71. These variations are merely illustrative.

What is claimed is:

1. A coupling for an air hose, the coupling comprising
   a one-piece plug member, the plug member comprising a fitting at a first axial end, the fitting being adapted for connection to an air hose, an external circumferential groove, a beveled external shoulder forming a wall of the groove, an axial bore, the axial bore being closed at a second axial end of the plug member, and a plurality of air passages intersecting the axial bore near the closed end of the bore;
   a two-piece coupler member, the coupler member receiving the plug member and releasably locking with the groove on the plug member; the coupler member comprising a ring seal trapped between the two pieces of the coupler member, and a valve member seatable on an axial side of the ring seal;
   the plug member, when coupled with the coupler member, forming a seal with an interior of the ring seal, displacing the valve member, and putting the air passages in the plug member functionally on the same axial side of the ring seal as the valve member.

2. The coupling of claim 1 wherein the bore comprises a portion at the first axial end of the plug member having a larger diameter than a portion at the second axial end of the plug member.

3. The coupling of claim 1 wherein the air passages are configured to direct air exiting them from the bore at least partially in a direction back toward the first end of the plug.

4. The coupling of claim 1 wherein the closed end of the bore is conical, the conical end redirecting at least some air moving axially down the bore outwardly and rearwardly through the openings.

5. The coupling of claim 1 wherein the air passages have a larger cross-sectional area than the area of the bore at their intersection with the bore.

6. A coupling for an air hose comprising a coupler member and a one-piece plug member, the plug member comprising a fitting at one axial end, the fitting being adapted for connection to an air hose, an external circumferential groove, an external shoulder adjacent the groove, an axial bore, the axial bore being closed at a second axial end of the plug member, and a plurality of air passages intersecting the axial bore, the air passages collectively having a greater cross-sectional area than the cross-sectional area of the axial bore.

7. A coupling for an air hose comprising a coupler member and a one-piece plug member, the plug member comprising a fitting at a first axial end, the fitting being adapted for connection to an air hose, an external circumferential groove, an external shoulder adjacent the groove, an axial bore, the axial bore being closed at a second axial end of the plug member, and a plurality of air passages intersecting the axial bore, the closed end of the bore and the air passages directing air entering from the first axial end of the bore outwardly at least partially back toward the first axial end.

8. A coupling for an air hose comprising a coupler member and a one-piece plug member, the plug member being formed as a single piece, the plug member comprising a fitting at a first axial end, the fitting being adapted for connection to an air hose, an external circumferential groove, an external shoulder adjacent the groove, an axial bore, the axial bore being closed at a second axial end of the plug member, and a plurality of air passages intersecting the axial bore near the second end of the fitting, the axial bore having a diameter at the intersection of said air passages no greater than the smallest diameter of the axial bore.

* * * * *